(12) United States Patent　(10) Patent No.: US 8,286,191 B2
Amini et al.　(45) Date of Patent: Oct. 9, 2012

(54) DYNAMICALLY COMPOSING DATA STREAM PROCESSING APPLICATIONS

(75) Inventors: Lisa Amini, Yorktown Heights, NY (US); Henrique Andrade, Croton-on-Hudson, NY (US); Bugra Gedik, White Plains, NY (US); Nagui Halim, Yorktown Heights, NY (US); Srinivasan Parthasarathy, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 12/465,910

(22) Filed: May 14, 2009

(65) Prior Publication Data

US 2010/0293301 A1　Nov. 18, 2010

(51) Int. Cl.
　*G06F 13/00*　(2006.01)
(52) U.S. Cl. .......................... 719/318; 709/227; 709/231
(58) Field of Classification Search .................. 719/318; 709/227, 231
See application file for complete search history.

(56) References Cited

U.S. PATENT DOCUMENTS

| | | | |
|---|---|---|---|
| 7,693,983 B1 | 4/2010 | Gupta et al. | |
| 7,908,369 B2 | 3/2011 | Truong et al. | |
| 8,102,836 B2 * | 1/2012 | Jerlhagen et al. | ............. 370/350 |
| 2002/0152305 A1 | 10/2002 | Jackson et al. | |
| 2003/0225876 A1 | 12/2003 | Oliver et al. | |
| 2007/0261041 A1 | 11/2007 | Amini et al. | |
| 2007/0299980 A1 | 12/2007 | Amini et al. | |
| 2008/0235685 A1 | 9/2008 | Amini et al. | |
| 2008/0256253 A1 | 10/2008 | Branson et al. | |
| 2008/0291863 A1 * | 11/2008 | Agren | ........................... 370/315 |
| 2009/0003436 A1 | 1/2009 | Levin et al. | |

OTHER PUBLICATIONS

Gedik et al., "Spade : The System S Delcarative Stream Processing Engine," SIGMOD '08 Jun. 9-12, 2008, Vancouver, BC Canada.
Abadi et al. The Design of the Borealis Stream Processing Engine, Proceedings of the 2005 CIDR Conference.
Beynon et al., DataCutter: Middleware for Filtering Very Large Scientific Datasets on Archival Storage Systems, Proceedings of the 8th Goddard Conference on Mass Storage Systems and Technologies/17th IEEE Symposium on Mass Storage Systems, College Park, MD, Mar. 2000.
Caltech. Sensing and Responding: Mani Chandy's biologically inspired approach to crisis management. ENGenious—Caltech Division of Engineering and Applied Sciences, Winter 2003.
Reuters Professional—stock market data feed. http://about.reuters.com/productinfo/s/ stock market data feed, Oct. 2007.

(Continued)

*Primary Examiner* — Andy Ho
(74) *Attorney, Agent, or Firm* — Ryan, Mason & Lewis, LLP

(57) ABSTRACT

Techniques for dynamically modifying inter-connections between components in an application are provided. The techniques include receiving a data producer profile for each output port within a software application to be executed on one or more processors, receiving a data subscription profile for each input port of each component of the application, establishing connections between the output ports and the input ports of the components in the application based on a comparison of each data producer profile and each data subscription profile, executing the application on one or more processors to process streams of data, receiving either or both of a new data producer profile or a new data subscription profile during the execution of the application, and establishing at least one new connection between an output port and an input port based upon a revised comparison of the received data profiles that include the new data profile.

29 Claims, 11 Drawing Sheets

OTHER PUBLICATIONS

Jain et al., Design Implementation, and Evaluation of the Linear Road Benchmark on the Stream Processing Core, International Conference on Management of Data, ACM SIGMOD, Chicago, IL 2006.
MATLAB, Oct. 2007.
Upadhyaya et al., Expressing and Exploiting Concurrency in Networked Applications with Aspen, Symposium on Principles and Practice of Parallel Programming, ACM PPoPP, San Jose, CA 2007.
Amini et al., SPC: A Distributed, Scalable Platform for Data Mining, Workshop on Data Mining Standards, Services and Platforms, DM-SSP, Philadelphia, PA 2006.
Carzaniga et al., Design and Evaluation of a Wide-Area Even Notification Service, ACM Transactions on Computer System, 19(3):332-383, 2001.
L. Davidsen, Building an ESB without limits. May 2007.
Kurc et al., Querying Very Large Multi-dimensional Datasets in ADR, Proceedings of the 1999 ACM/IEEE SC Conference, SC 1999, Portland, OR, Nov. 1999.
Thies et al., StreamIt: A Language for Streaming Applications, International Conference on Compiler Construction, ICCC, Grenoble, France, Apr. 2002.
Vitter, Random Sampling with a Reservoir, ACM Transactions on Mathematical Software, 11:37-57, 1985.
Arasu et al., The CQL Continuous Query Language: Semantic Foundations and Query Execution, Technical Report, InfoLab—Stanford University, Oct. 2003.
Chakravarthy et al., Multiple Query Processing in Deductive Databases using Query Graphs, Proceedings of the 12th International Conference on Very Large Databases, Kyoto, Aug. 1986.
Pauw et al., Streamsight—A Visualization Tool for Large-Scale Streaming Applications, Symposium on Software Visualization, ACM Soft Vis, Herrsching am Ammersee, Germany, 2008.
Hadoop.
Emigh, Morningstar detangles options data.
Wolf et al., SODA: An Optimizing Scheduler for Large-Scale Stream-Based Distributed Computer Systems, Technical Report RC 24453, IBM Research, Dec. 2007.
Tu et al., Load Shedding in Stream Databases: A Control-Based Approach, Very Large Data Bases Conference, VLDB, Sep. 2006.
Arasu et al., Stream: The Stanford Stream Data Manager, IEEE Data Engineering Bulletin, 26, 2003.
Chandrasekaran et al., TelegraphCQ: Continuous Dataflow Processing for an Uncertain World, Conference on Innovative Data Systems Research, CIDR, 2003.
Energy Information Administration, Electric power industry overview. http://www/eia.doe/gov/cneaf/electricity/page/prim2/toc2.html, Oct. 2007.
IBM WebSphere Front Office for Financial Markets, Version 3.0—WebSphere, Oct. 2007.
StreamBase Systems.
IBM Unstructured Information Management Architecture (UIMA).
Wu et al., Challenges and Experience in Prototyping a Multi-Modal Stream Analytic and Monitoring Application on System S. Very Large Data Bases Conference, VLDB, 2007.
Gedik et al., SPADE: The System S Declarative Stream Processing Engine, International Conference on Management of Data, ACM SIGMOD, Vancouver, Canada, 2008.
Leighton et al., Multicommodity Max-flow Min-cut Theorems and their Use in Designing Approximation Algorithms, Journal of the ACM 46(6), 1999, pp. 787-832.
Oracle.
Andrade et al., Scale-up Strategies for Processing High-Rate Data Streams in System S, International Conference on Supercomputing, ACM ICS, 2008.
Balakrishnan et al., Retrospective on Aurora, VLDB Journal, Special Issue on Data Stream Processing, 2004.
Coral8, Inc., May 2007.
IBM DB2. Oct. 2007.
Gedik et at., CellSort: High Performance Sorting on the Cell Processor, Proceedings of the Very Large Data Bases Conference, VLDB, 2007.
Gedik, et al., Executing Stream Joins on the Cell Processor, Proceedings of the Very Large Data Bases Conference, VLDB, 2007.
Girod, et al., XStream: a Signal-Oriented Data Stream Management System, Proceedings of the International Conference on Data Engineering, IEEE ICDE, 2008.
IBM General Parallel File System, Oct. 2007.
Hulten et al., VFML-a toolkit for mining high-speed time-changing data streams, 2003.
IBM, Celll Broadband Engine Architecture and its First Implementation, Technical Report Version 1.0, IBM Systems and Technology Group, 2005.
Intel. IXP2400 Network Processor Hardware Reference Manual. Technical report, Intel Corporation, May 2003.
Liu et al., Use of OWL for describing Stream Processing Components to Enable Automatic Composition, In OWL: Experiences and Directions, OWLED, 2007.
Jacques-Silva et al., Towards autonomic fault recovery in System S. In Proceedings of the International Conference on Autonomic Computing, ICAC (2007).
LOFAR. Jun. 2008.
LOIS. Jun. 2008.
Olston et al., Pig Latin: A not-so-foreign language for data processing. In Proceedings of the International Conference on Management of Data, ACM Sigmod (2008).
Publish/Subscribe.
XEP-0060: Publish-Subscribe.
Roman et al., Dynamic Application Composition—Customizing the behavior of an active space.
Davidyuk et al., An algorithm for task-based application composition, Nov. 2007.
Li et al., Enabling dynamic composition and coordination for autonomic grid applications using the rudder agent framework. Knowledge Engineering Review, vol. 00:0, 1-15, 2006.
U.S. Appl. No. 12/130,034, filed May 30, 2008, entitled "Method for Generating a Distributed Stream Processing Application."
U.S. Appl. No. 12/139,651, filed Jun. 16, 2008, entitled "Method for High-Performance Data Stream Processing."
U.S. Appl. No. 12/465,757, filed May 14, 2009, entitled "Profile-Driven Data Stream Processing."
U.S. Appl. No. 12/489,805, filed Jun. 23, 2009, entitled "Portioning Operator Flow Graphs."
U.S. Appl. No. 12/466,017, filed May 14, 2009, entitled "Application Resource Model Composition from Consituent Components."

\* cited by examiner

DYNAMICALLY COMPOSING DATA STREAM PROCESSING APPLICATIONS

GOVERNMENT CONTRACT

This invention was made with Government support under Contract No.: H98230-07-C-0383 awarded by the United States Department of Defense. The government has certain rights in this invention.

FIELD OF THE INVENTION

Embodiments of the invention generally relate to information technology, and, more particularly, to data stream processing.

BACKGROUND OF THE INVENTION

The stream processing computational paradigm includes assimilating data readings from collections of software or hardware sensors in stream form (that is, an infinite collection of tuples carrying the information produced by the external data sources), analyzing the data, and producing actionable results, possibly in stream format as well. Stream processing applications may be comprised of components, each of which may produce a data stream that may be consumed by another component in the application. For example, in traffic management systems, it is conceivable that every driver carrying a cell phone becomes a data source that feeds information about its location and speed into a congestion control system. In such a situation, the data collection portion of a distributed traffic management platform may register its interest in subscribing to all possible data sources (for example, all drivers carrying a cell phone in a particular region) to increase the accuracy of congestion predictions it might make. Therefore, there is a need to provide automatic routing of data sources. In the above case, this could include routing the instantaneous readings capturing the driver speed and location, in addition to traffic accident locations, and road maintenance schedules to data consumers (in this example, the traffic and congestion management system platform).

Typically, a stream processing application can include dozens to hundreds of analytic operators, deployed on systems hosting many other, potentially interconnected, stream applications, distributed over a large number of processing nodes. In existing approaches, implementing the flow graphs that will interconnect an application or allow multiple applications to be integrated is usually achieved in an ad hoc way, by hard coding the inter- and intra-application connections or by relying on publisher-subscribe or enterprise bus type of mechanisms that have many shortcomings concerning scalability issues.

The production of data by a producer may be intermittent relative to the execution of the application. For example, large-scale distributed applications being developed in the realm of infrastructure monitoring (for example, traffic management systems, energy distribution systems, large-retailer supply chain management systems, distributed fraud and anomaly detection systems, surveillance systems, etc.) tend to be long-running applications designed to stay up continuously except perhaps during well-planned maintenance outages. Moreover, these applications are often designed to cooperate amongst themselves, for example, by having traffic sensors drive automated traffic controls for reducing congestion.

In many cases, the raw data sources that feed existing applications can become available and unavailable continuously with varying time granularities (that is, from a few seconds to a few days), as some of these sources are transient. In such a situation, the data collection portion of a platform may register its interest in subscribing to all possible raw data sources. Therefore, a need exists to provide automatic routing of data sources to data consumers.

Existing approaches include publish/subscribe systems. However, publish/subscribe systems describe data characteristics at the granularity of individual data items generated by the producers, rather than at the granularity of a producer. Such an approach is impractical due to the inefficiencies associated with annotating individual data items as opposed to annotating at the granularity of a source of data.

SUMMARY OF THE INVENTION

Principles and embodiments of the invention provide techniques for dynamically composing data stream processing applications. An exemplary method (which may be computer-implemented) for dynamically modifying inter-connections between a plurality of components in a component-based data stream processing application, according to one aspect of the invention, can include steps for receiving a data producer profile for each of a plurality of output ports within a software application to be executed on one or more processors, wherein the application comprises a plurality of components that each comprise an output port that produces a data stream and an input port that consumes a data stream, and wherein each data producer profile describes a characteristic of the data produced by the corresponding output port, receiving a data subscription profile for each of one or more input ports of a plurality of components of the application, wherein each data subscription profile describes a characteristic of the data consumed by the input port, establishing one or more connections between output ports and input ports of the plurality of components in the application based on a comparison of received data producer profiles and received data subscription profiles, executing the data stream processing application on one or more processors to process one or more streams of data, receiving either or both of a new data producer profile or a new data subscription profile during the execution of the application, and establishing at least one new connection between an output port and an input port based upon a revised comparison of the received data profiles that include the one or more new data profiles.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) and/or component(s), or (iii) a combination of hardware and software modules/components; any of (i)-(iii) implement the specific techniques set forth herein, and the software modules/components are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
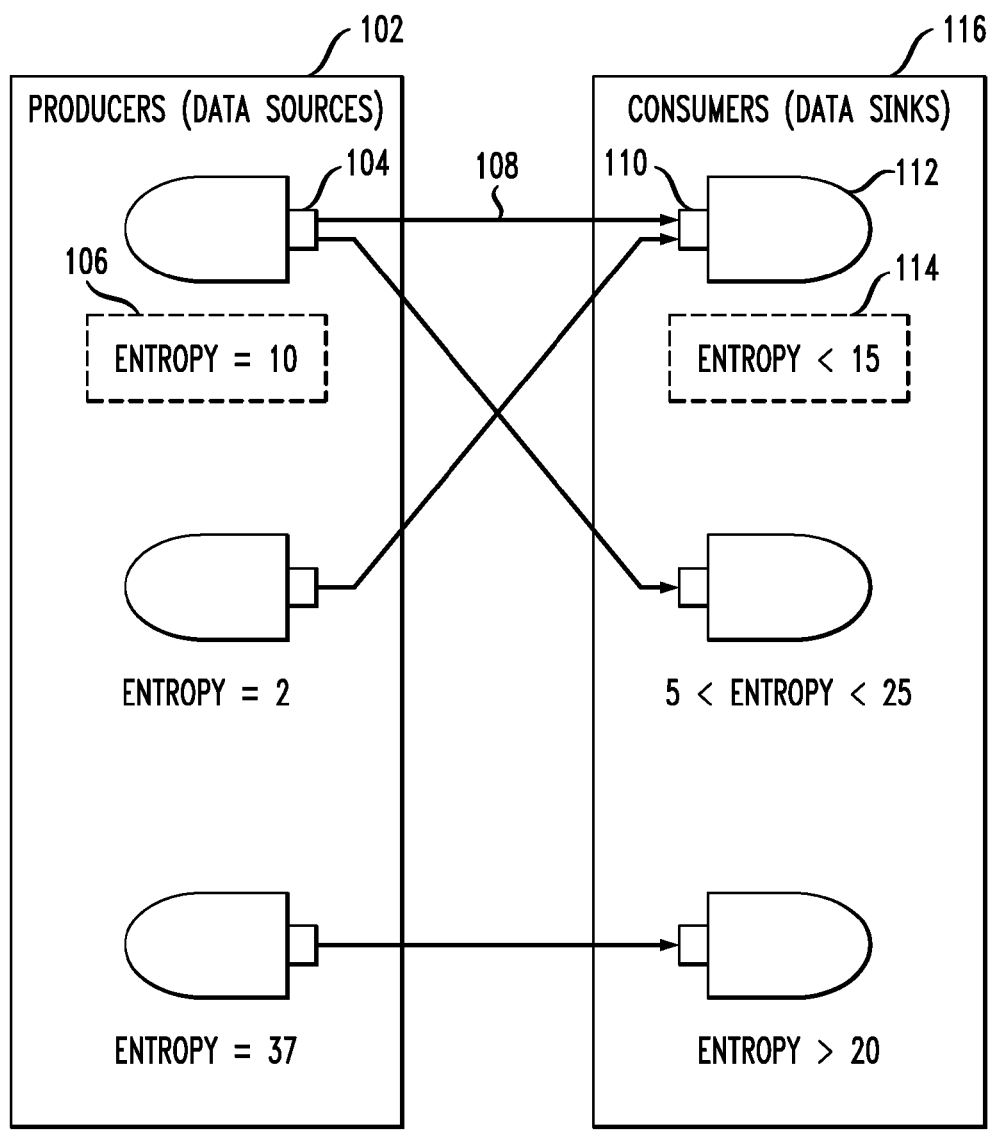
FIG. 1 is a diagram illustrating dynamically modifying one or more inter-connections between a plurality of components in a component-based application, according to an embodiment of the invention.

Principles of the invention include profile-based dynamic application composition. High-performance, distributed computing stream processing middleware can support multiple applications running concurrently, with each application potentially including several components that act as data sources (producers) and components that act as data sinks (consumers). One or more embodiments of the invention provide techniques for describing the characteristics of the data produced by such applications at the granularity of a producer, for describing the characteristics of the data required by each consumer, as well as for dynamically matching and routing data from the appropriate consumers to the consumers.

The techniques detailed herein include dynamically composing distributed applications by determining the structure of the data flows between the various components of the application and establishing the requisite physical routes and connections for data exchange. In addition, the techniques include methods for dynamically manipulating (for example, querying, inserting, deleting, and/or changing) producer level characteristics (or properties), consumer subscriptions based on producer properties, as well as ranking functions which prioritize the producers that match each consumer.

In large-scale distributed applications, one or more embodiments of the invention include locating data sources in application-meaningful ways, allowing logic subscription specifications where, rather than only relying on the name of the data sources (which typically may not be known until deployment time), a richer set of properties can be used to infer and establish the producer/consumer relationships.

Additionally, when dealing with a potentially large set of data sources, the techniques described herein provide scalability. One or more embodiments of the invention include a composition mechanism used to connect data producers to data consumers that has a built-in mechanism to cope with large numbers of data sources that can satisfy a data subscription expression. Also, the techniques detailed herein include ranking and constraining the number of data sources that should be dynamically connected to the data consumers. Such a ranking mechanism can also be programmatically describable, so a data consuming application can prioritize which sources to use according to application-specific criteria.

Also, data consumers often have a budget both in terms of the amount of data they can ingest (for example, to restrict the number of sources to be processed subjected to a maximum aggregate ingest rate) as well as thresholds in terms of the quality of data they can process (for example, to filter data sources subjected to their specific noise level or other domain-specific quality metric). As such, one or more embodiments of the invention, in connecting consumers to producers, facilitate giving consumers an option to choose to establish and rank connections based on such attributes as well.

Further, the techniques described herein facilitate self-modification of (long-running) application behavior according to changes in the data characteristics. That can potentially happen, for example, in terms of content (for example, a sudden slow-down in traffic might trigger the consumption of video data from a particular location to assess whether a traffic accident has recently happened).

Applications can be long running while data sources may arrive and depart continuously in a distributed system. One or more embodiments of the invention include automatically establishing the requisite connections between data sources and relevant consumers. Additionally, the number of data sources within a system can potentially be huge. As such, logical predicate-based data subscription, rather than explicitly naming the data sources at each consumer, leads to scalable application design instead of a cumbersome human-intensive design.

Also, quantity and quality of the data produced by each source could potentially change. One or more embodiments of the invention enable applications to modify their behavior in accordance with changes in data characteristics as well as changes in the analytics that are being carried-out. The techniques described herein also provide a symbiotic and cooperative environment for various components of an application and/or multiple applications to coexist within a distributed system.

One or more embodiments of the invention also include carrying-out application parameterization. That is, application behavior can be parameterized depending upon the properties of data. By way of example, one can replicate a certain portion of the data processing for different data sources.

As detailed herein, one or more embodiments of the invention include a mechanism for dynamically interconnecting producers and consumers of data within a distributed application. Data sources can be described based on properties of the data generated by the producer along with other producer-specific properties (for example, properties related to where and how the producer was deployed, properties inferred from the run-time environment, etc.).

Also, data subscriptions can be constructed based on logical conditions and/or a procedural function that operates on these properties and, ultimately, evaluates to true of false, indicating whether or not a producer/consumer relationship should be created. For example, a subscription may be expression-based, that is, it can take the form of a declarative expression stating a subscription predicate using an extensible markup language (XML) path language-(XPATH)-based syntax or be a Boolean expression on properties.

FIG. 1 is a diagram illustrating dynamically modifying one or more inter-connections between a plurality of components in a component-based application, according to an embodiment of the invention. By way of illustration, FIG. 1 depicts producers (data sources) 102 as well as consumers (data sinks) 116. Producers 102 include output ports (for example, output port 104) and stream profiles (for example, stream profile 106. Producers can also include stream properties (such as, for example, the stream property of "entropy") as well as stream property values.

Consumers 116 include input ports (for example, input port 110) as well as processing elements implementing application logic running on a host (for example, processing element 112). Consumers can also include stream subscription expressions (such as, for example, stream subscription expression 114 "entropy <15"). FIG. 1 also depicts stream connections between the producers and consumers (for example, stream connection 108).

Figure 2:
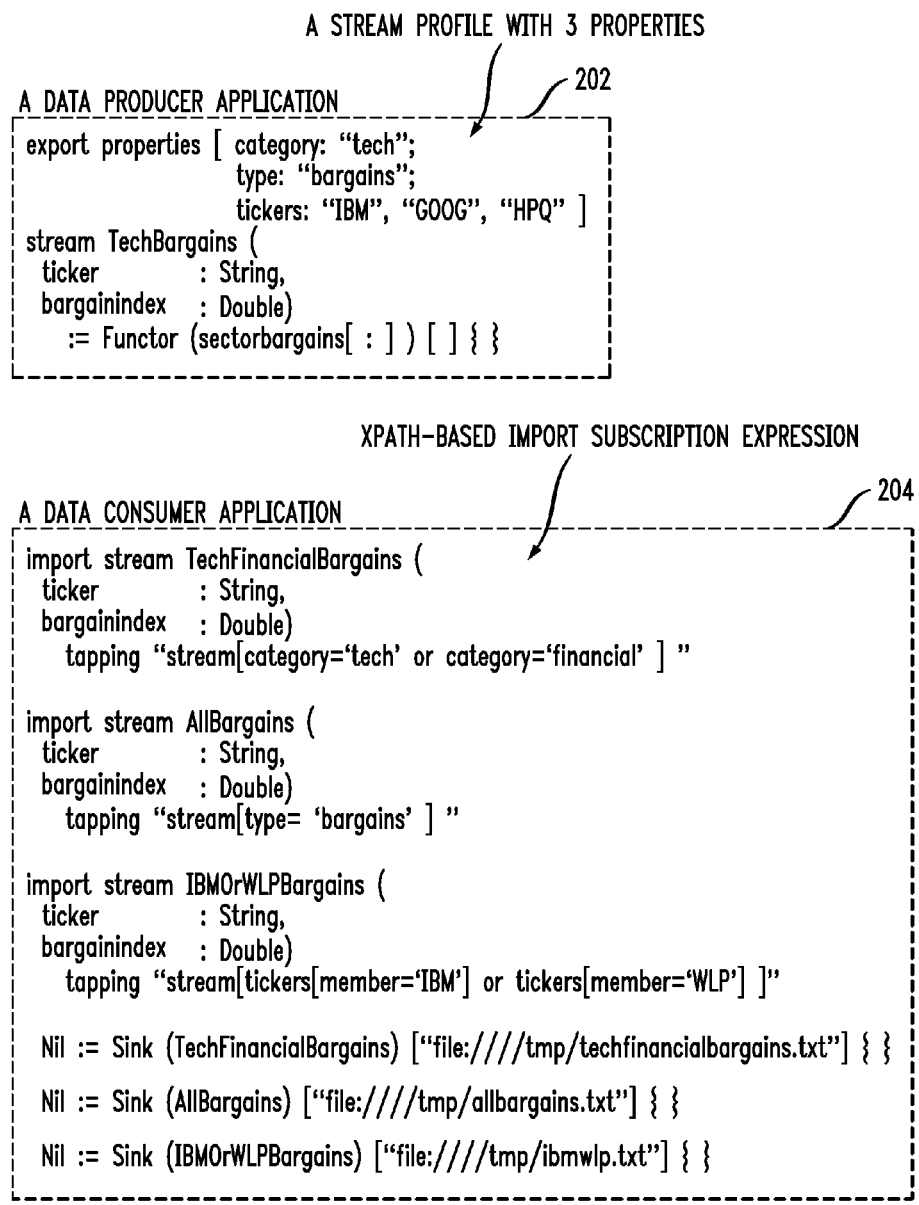
FIG. 2 is a diagram illustrating exemplary syntax for an XPATH-based composition mechanism, according to an embodiment of the invention.

FIG. 2 is a diagram illustrating exemplary syntax for an XML path language-(XPATH)-based composition mechanism, according to an embodiment of the invention. By way of illustration, FIG. 2 depicts a data producer application 202 that includes a stream profile with three properties, as well as a data consumer application 204 that includes XPATH-based import subscription expression. FIG. 2 shows a block diagram including a data-flow representation of an application. Additionally, one or more embodiments of the invention include a ranking technique that can be used to assess the importance of individual data sources that match the subscription. Such a ranking mechanism enables constraining the maximum number of producer/consumer relationships that might be physically established for a specific consumer.

The techniques detailed herein include, as noted, enabling the incremental deployment of applications via decoupling of the application logic from the data flow that originates from other components and applications as well as the evolution and dynamic adaptation of applications in response to changes in the quality, volume, the availability of data, and the overall load imposed on the system, among others.

Each producer of data within one or more embodiments of the invention is associated with a data profile. For instance, consider an implementation of profile-based application composition within a stream computing system (for example, the INFOSPHERE STEAMS middleware application provided by International Business Machines Corp. of Armonk, N.Y.). In such an application including processing elements (PEs), each of which has multiple input and output ports with each output port producing a single stream, a data profile is associated with each output port. The data profile can include a unique identifier for the producer associated with it, and it can also include a collection of properties which characterizes the data generated by the producer. These properties may belong to one of the several pre-defined data types (both simple and complex). For instance, in a stream computing system, data properties could be of type string, double, long, stringlist, doublelist, and longlist (the last three being array types). Each profile property has a name, and two properties within a specific profile cannot have the same name.

Additionally, each consumer describes the set of producers of interest to it using a subscription expression. A subscription expression is an arbitrary Boolean expression on the properties of data profiles. All producers whose profile properties satisfy the given expression are potential candidates for a consumer. Also, other orthogonal considerations may decide if a producer needs to be connected to a subscriber, including security, the scope of the producer and consumer, and compatibility of producer and consumer, output and input data formats, respectively. By way of example, in a stream computing system (for example, System-S), subscription expressions can be defined using an XPATH syntax. For example, the expression stream[location="yorktown"][tags [member="video"]] matches all data profiles which contain a string property called location whose value is "yorktown," and which contain a stringlist property called tags which contains a member called "video."

Further, one or more embodiments of the invention include logic that dynamically determines and establishes the interconnections between producers and consumers, which can include, for example, three sub-components. A sub-component can include a profile manager, which is a reliable data structure for storing the data profiles. It provides the APIs for manipulating and querying the data profiles at run-time. In a stream computing system, the profile manager may be implemented using an extensible markup language (XML) tree representation along with the application programming interfaces (APIs) for manipulating and querying the data profiles.

A second sub-component can include a matching technique, which computes the matching (or connections) between the producers and consumers by checking which profiles match which subscription expressions (possibly, with engineered and optimized in order to maximize the matching efficiency). The technique is executed during application startup and whenever profiles or subscription expressions are modified as well as when processing elements (for example, the run-time analytics container in a stream computing system) come and go. By way of example, an underlying XML engine can be used to match profiles in the profile manager against the XPATH based subscription expressions.

Another sub-component can include APIs for profile and subscription manipulation. Such APIs enable the application to modify the profile properties and subscription expressions at run-time. In one or more embodiments of the invention, the above-noted sub-components can reside within a distillery graph manager (DGM) module.

The techniques detailed herein also include programming language level features, which provide the ability to define and initialize data profiles and subscription expressions at the time of application development. Such profiles and subscriptions initialized through the programming language come into effect at the time of application startup. In one or more embodiments of the invention, programming language (for example, SPADE) provides the features to achieve the above. The SPADE programming model is more fully described by Gedik et al. in "SPADE: The System S Declarative Stream Processing Engine," SIGMOD Conference 2008: 1123-1134. As described herein, one or more embodiments of the invention can be detailed within an exemplary context of distributed run-time infrastructure and programming models developed as part of a general purpose data stream processing middleware (for example, a data stream processing system such as INFOSPHERE STREAMS and the SPADE programming language, respectively). Such support structured and unstructured distributed data stream processing applications can span a large number of compute nodes.

Additionally, such middleware can execute a large number of long-running applications as part of one or more applications. Applications can interact as part of a single application or a set of related applications possibly taking the form of complex data-flow graphs. A data-flow graph can include a set of processing elements (for example, run-time execution units) connected by data streams, where each data stream carries a series of tuples. The processing elements are containers that host operators that implement data stream analytics and are distributed on compute nodes. The compute nodes can be organized, for example, as a shared-nothing cluster of workstations or as a large supercomputer.

The processing elements communicate with each other via their input and output ports, which are connected by the data streams. The processing element ports, as well as the data streams, can be typed, employing application-defined type systems (which are typically built by combining system supported basic types that range from numeric types such as eight-bit integers to complex types such as lists of basic type elements). Processing elements can also be explicitly connected using hard-coded stream connections defined at compile-time or can be dynamically connected through streams that rely on properties of data streams (for example, "streams that carry surveillance video from cameras located in Building A") via mechanisms described herein. Note that these connections are dynamic (that is, made at run-time, upon the availability of a stream that matches a subscription expression) and, therefore, allow the middleware to support incremental application development and deployment.

Declarative language (for example, the SPADE language) is used to program applications for these middleware, as seen, for example, in FIG. 2. The language provides a rapid application development front-end that includes a plurality of features. One feature can include a language for flexible composition of parallel and distributed data-flow graphs. This language can be used directly by programmers, or can be used between task-specific higher level programming tools (for example, for querying, composition of map-reduce flows, or the like) and lower-level application programming interfaces (APIs). Another feature of the declarative language can include extensibility based on support for adding new toolkits of type-generic stream processing operators. Also, yet another feature of the declarative language can include a broad range of edge adapters that are used to ingest data from external sources and to publish results to external consumers (for example, network sockets, databases, file systems, proprietary platforms, etc.).

The programming language can also provide a stream-centric, operator-based programming model, as well as the syntactic constructs whereby an application can import from or export data to other applications via mechanisms described here, for example, as depicted by FIG. 2. A stream-centric design implies a language where the basic building block is a stream. In other words, an application writer can quickly translate the flows of data from a block diagram into the application describing source code simply by listing the stream flows and stating which operator generates individual streams. The operator-based programming is focused on designing the application by reasoning about the smallest possible building blocks necessary to deliver the computation an application is designed to perform.

As noted herein, in one or more embodiments of the invention, multiple applications can interoperate by consuming and producing streams that cross application boundaries. The application composition permits the development of dynamic topologies where different applications are possibly deployed at different times and producer-consumer relationships between them are established at run-time. In other words, every time a new application is instantiated, the dataflow management componentry assesses whether that new application is producing and exporting any streams that might be of interest to other running applications.

Likewise, the dataflow management component inspects the already-running applications and verifies whether any of them produces and exports streams that are of interest to the newly deployed application. Once new producer-consumer relationships are found, the dataflow management componentry instructs that producers connect to consumers. These connections are ephemeral in the sense that they are automatically removed once one of the parties (producer or consumer) terminates, subscriptions are changed, and/or data source properties are changed and potentially no longer match subscriptions.

Operator developers can also be provided with programmatic ways (via well-defined APIs) to both changing an operator's input port subscription, the stream properties associated with a stream profile, and the ranking criteria associated with an operator's subscription. Also, changes caused by invoking the specific APIs to implement these changes trigger modifications in the data-flow topology at run-time as new stream connections are made and/or torn down.

Figure 3:
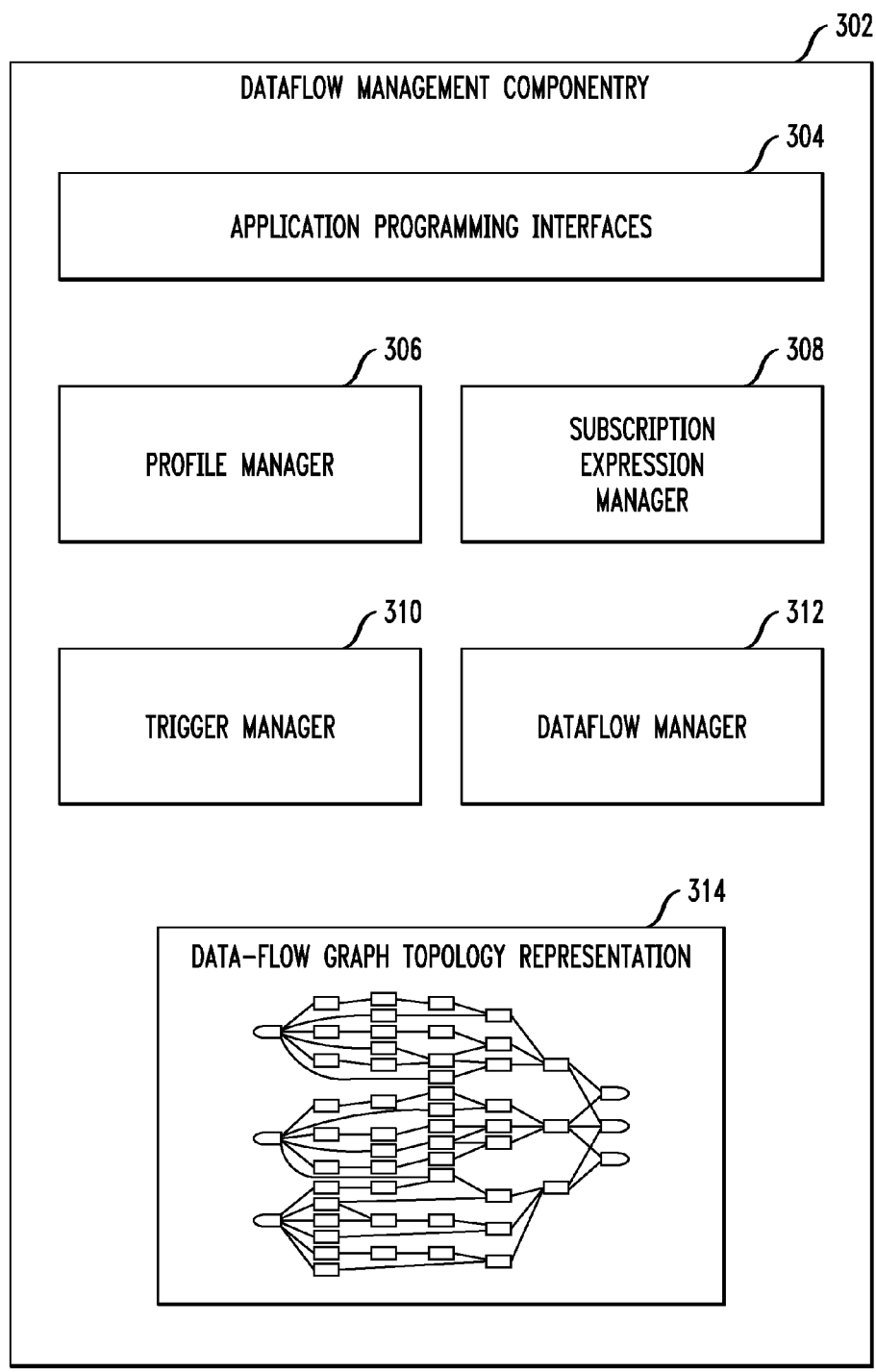
FIG. 3 is a diagram illustrating an exemplary organization of a multi-component apparatus used to implement one or more embodiments of the invention.

FIG. 3 is a diagram illustrating an exemplary organization of a multi-component apparatus used to implement one or more embodiments of the invention. By way of illustration, FIG. 3 depicts dataflow management componentry 302 that includes application programming interfaces (APIs) 304, a profile manager 306, a subscription expression manager 308, a trigger manager 310, a dataflow manager 312 and a dataflow graph topology representation 314. APIs 304 can be used for querying, inserting, deleting and/or modifying stream profiles associated with the stream produced by an output port, input port's subscription expressions, input port's ranking criteria and input port's subscription functions.

The profile manager 306 acts as a reliable store for storing the qualitative and quantitative properties associated with each data stream (or equivalently, the output port of an operator, which produces the data stream). Specifically, each stream is characterized by a unique data profile that includes a collection of properties. Each of these properties has a typed property name (for example, an average noise level associated with an audio stream, given as a single-precision floating point number) and has a specific value. In an exemplary implementation of the profile manager in a processing system, the stream properties can be defined to hold values of any data type supported by the programming language. The collection of stream profiles can be internally stored by the profile manager in the form an XML tree with the tree nodes forming the profile properties. Examples of stream profiles and an illustration of the internal contents of the Profile Manager are shown in FIG. 4.

Figure 4:
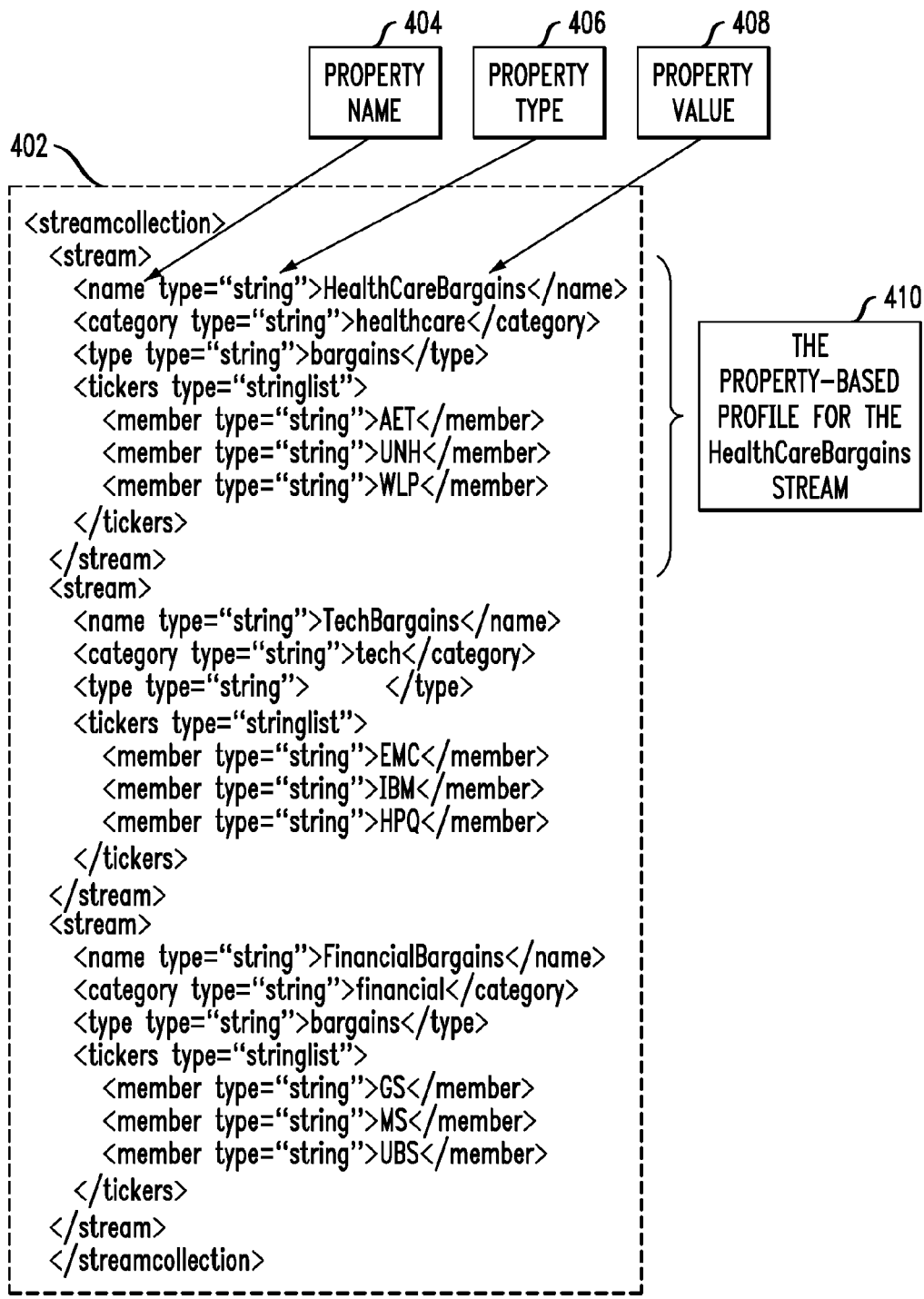
FIG. 4 is a diagram illustrating an exemplary list of extensible markup language (XML-) encoded profiles associated with streams produced by an application as kept by the profile manager component, according to an embodiment of the invention.

FIG. 4 is a diagram illustrating an exemplary list of XML-encoded profiles 402 associated with streams produced by an application as kept by the profile manager component, according to an embodiment of the invention. By way of illustration, FIG. 4 also depicts a property name 404, a property type 406, a property value 408 and the property-based profile for the exemplary HealthCareBargains stream 410.

A subscription expression manager (component 308 in FIG. 3) is a component which is complementary to the profile manager. The subscription expression manager acts as a reliable store for containing the subscription expressions of stream consumers (or equivalently, the input ports which are used to ingest the data streams matching its subscription as well as ranking criteria). Specifically, each input port which uses, for example, the expression-based stream subscription mechanism, is associated with a unique Boolean subscription expression. This expression specifies the logical condition which the properties contained in a stream profile must satisfy in order for it to be consumed by the corresponding input port. An exemplary implementation of the subscription expression manager in a processing system (for example, System S) allows for arbitrary Boolean XPATH expressions (involving stream profile properties) as consumer subscriptions. In such a case, each input port is associated with a port description that includes, among other things, the specific subscription and ranking method, and the collection of port descriptors is stored in the data flow manager.

The subscription expression manager also provides a way for registering subscription functions. Subscription functions provide an arbitrarily powerful, customized, and procedural way of computing matches for a particular consumer. In other words, the logic for determining which streams generated by output ports are routed to this consumer resides within the subscription function itself. These functions can be, for example, registered by individual consumers (when they are instantiated) with the subscription expression manager.

Both the profile manager as well as the subscription expression manager enables other components to programmatically query them through APIs. These APIs may also be invoked at run-time by stream processing operators defined by a programming language (for example, SPADE). In one or more embodiments of the invention, these are two mechanisms used to extend the programming language by creating new operators (for example, organized in toolkits) to cater to specific application domains such as finance engineering or radar data processing. These APIs may also be invoked by an application programmer through an external program for browsing the profiles of the various streams currently deployed in the system, as well as for examining the subscription expressions of input ports at the time of application development.

Specifically, the APIs may allow for retrieving, for example, the profiles associated with a specific stream produced by an operator's output port, or with all output ports from operators deployed by applications currently in the system. The APIs may also allow for retrieving the subscription expressions or functions as well as the optional ranking criteria associated with a specific input port, or with all input ports from operators deployed by applications currently in the system. Also, the APIs may allow for retrieving the stream profiles matching a given subscription expressions, and the subscriptions matching a given stream profile. In addition to query-type APIs, the profile manager and subscription expression manager can also contain APIs for creating, deleting, and modifying stream profiles, individual profile properties, consumer subscription expressions, subscription functions, and subscription ranking criteria.

The data flow manager (component 312 in FIG. 3) invokes its matching technique for determining which output ports must be connected to which input ports. The stream generated by an output port is a potential match for an input port if the profile properties associated with that stream satisfy the subscription expression (or function) associated with an operator's input port. In addition to satisfying this condition, the data flow manager may also enforce other necessary conditions for the output port to be connected to the input port. For instance, the set of attributes present in the tuples consumed by the input port may be stipulated to exactly match the attributes present in the tuples produced by the output port. In other words, the tuple attribute structure must match the input port's schema.

Further, the input port may be stipulated to have sufficient scoping and security privileges in order to consume tuples from this input port. In general, after the above conditions, an input port could be matched with multiple output ports (and vice-versa).

One or more embodiments of the invention include the data flow manager, in a processing system, making use of a library with functional support to evaluate the XPATH-based consumer subscriptions against the stream profiles.

The basic expression evaluation capability described herein may be extended by the data flow manager, as detailed below. For example, the data flow manager can invoke a semantic engine and ontology in order to enhance its expression evaluation and matching functionality. By way of example, consider a scenario where an input port's subscription expression seeks all streams whose "origin" property has the value "New York." If a stream exists whose profile contains a property called "provenance" with a value "Westchester," the semantic engine, with the help of the ontology management framework, would automatically determine that this stream is indeed a match for the consumer as the ontological relationship between Westchester County and New York State could be inferred.

Additionally, the data flow manager can also invoke a ranking engine which chooses only a subset of streams which match a subscription expression, and connects only this subset to the consumer. The ranking engine may provide various types of ranking mechanisms: for instance, the ranking could be performed on the values of certain profile properties (for example, if the 'quality' of a stream is one such property). The ranking mechanism could also be supplied an arbitrary optimization objective for selecting the subset of streams along with constraints on rates, number of selected streams, and other related quantities; individual consumers could also supply arbitrary ranking functions, which could be registered with the data flow manager and applied whenever streams which match this consumer needs to be ranked.

Further, the data flow manager can also invoke user-defined subscription functions supplied by individual consumers in order to provide arbitrary, customized and more sophisticated matching capabilities to those consumers.

In addition to providing the matching and ranking functionality described above, the data flow manager can also act as a reliable store for the various data objects associated with dynamic application composition. This can include, for example, the collection of input port descriptors which contain their subscription expressions or subscription functions. In addition, the current set of connections that exist between the output ports and the input port can also be stored as part of the data flow manager for reliability and query efficiency.

The trigger manager (component 310 in FIG. 3) is responsible for invoking the matching and ranking techniques within the data flow manager whenever the connections between output and input ports need to be recomputed, as well as for updating the profile manager and subscription expression managers whenever new applications (and their operator's output and input ports) are deployed on a processing system, or existing applications (and their operator's output and input ports) are deleted or modified.

Figure 5:
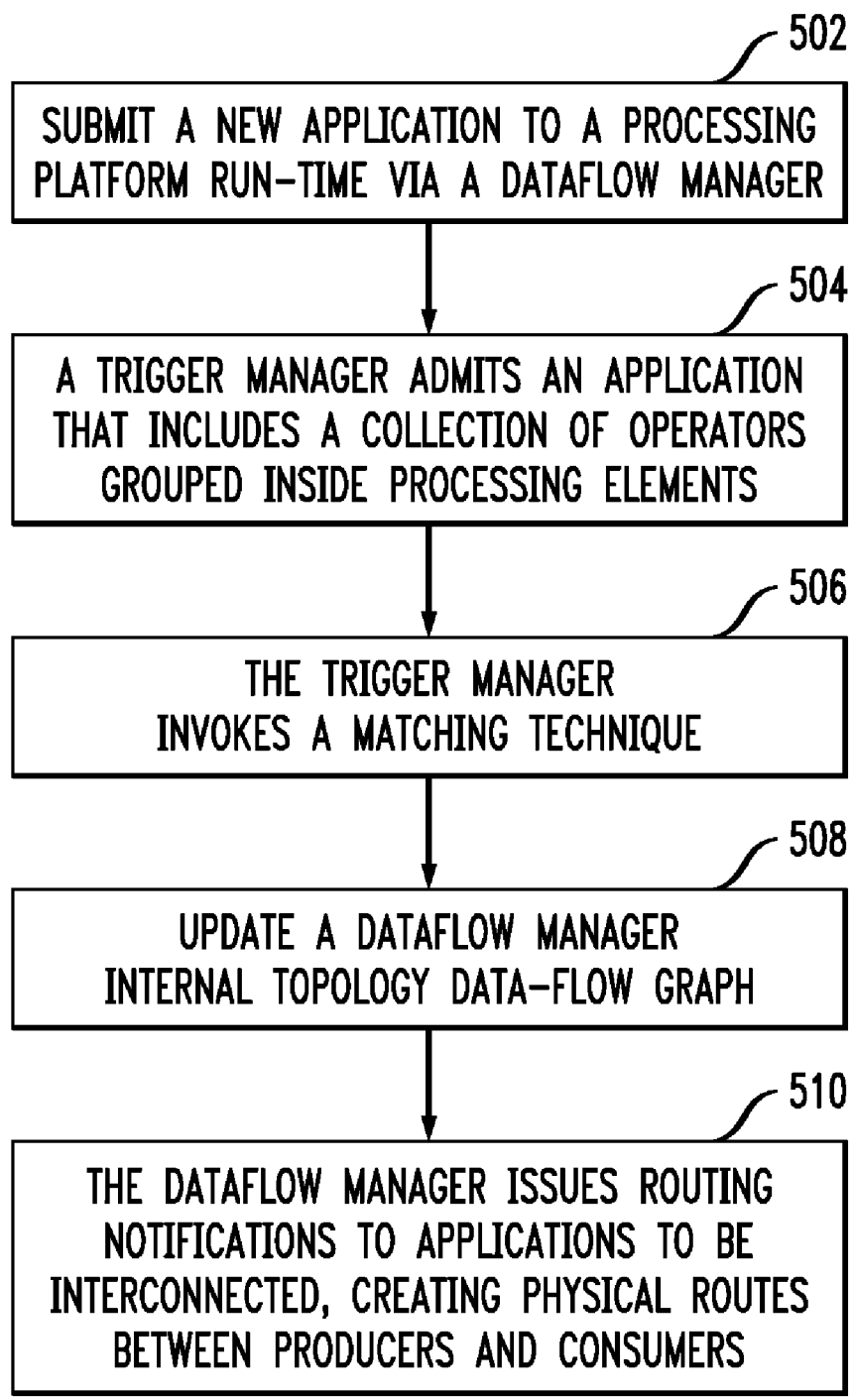
FIG. 5 is a flow diagram illustrating how the deployment of a new application triggers a modification in the flow-graph as new producer and/or consumer stream connections are made, according to an embodiment of the invention.

The interactions (or the sequence of API calls) that are involved between the various components of one or more embodiments of the invention can include as follows. One can include the instantiation of a new application (for example, a System S application). Recall that such an application is composed of a collection of processing elements (PEs), each of which contains a set of input ports which ingest streams and a collection of output ports which produce output streams. When a new application is submitted to the system run-time for instantiation (as depicted, for example, by FIG. 5), the system run-time calls the trigger manager APIs for application registration, passing as a parameter, the list of PEs contained in the application, along with the collection of each PE's input and output port descriptors.

For each of the output ports contained in the application, the trigger manager in turn invokes the profile manager APIs to create a new stream profile (and ensures that the profile manager is populated correctly with the properties for the new streams in the yet-to-be instantiated application). Similarly, for each of the input ports in the application, the trigger manager invokes the subscription expression manager APIs to create a new input port descriptor which also contains the subscription expression or a pointer to the subscription function associated with this input port. Also, the trigger manager invokes the matching technique in the data flow manager, which re-computes the set of potentially matching streams for all the input ports, including the new input ports belonging to operators in the yet-to-be instantiated application. This can be followed by the call to the ranking technique, which determines the final set of matched streams for each of the input ports. Additionally, the data flow manager can issue a call to the routing component in order to physically establish the connections that have been computed through the above process and remove the physical connections that have ceased to be valid matches after the above process.

As noted above, FIG. 5 is a flow diagram illustrating how the deployment of a new application triggers a modification in the flow-graph as new producer and/or consumer stream connections are made, according to an embodiment of the invention. Step 502 includes submitting a new application to a processing platform (for example, System S) run-time via a dataflow manager. Step 504 includes a trigger manager admitting an application that includes a collection of operators grouped inside processing elements (PEs). Additionally, the trigger manager can perform the following operations. By way of example, for each output port, a profile manager is populated with information about the properties of each exported stream in the application. Also, for each input port, a subscription expression manager is populated with information about each subscription expression and/or function and ranking criteria.

Step 506 includes the trigger manager invoking a matching technique. The trigger manager can further perform the following operations. For each input port of the new application, streams can be found that match the subscription expression and/or function. Also, the trigger manager applies ranking criteria and culls the list to include a maximal number of streams that satisfies the constraint imposed by the ranking criteria. Further, for each input port belonging to other applications, the trigger manager can assess whether exported streams of the new application match their subscription expression and/or function, respecting their ranking criteria.

Step 508 includes updating a dataflow manager internal topology data-flow graph. Also, step 510 includes the dataflow manager issuing routing notifications to applications to be interconnected, creating physical routes between producers and consumers.

Figure 6:
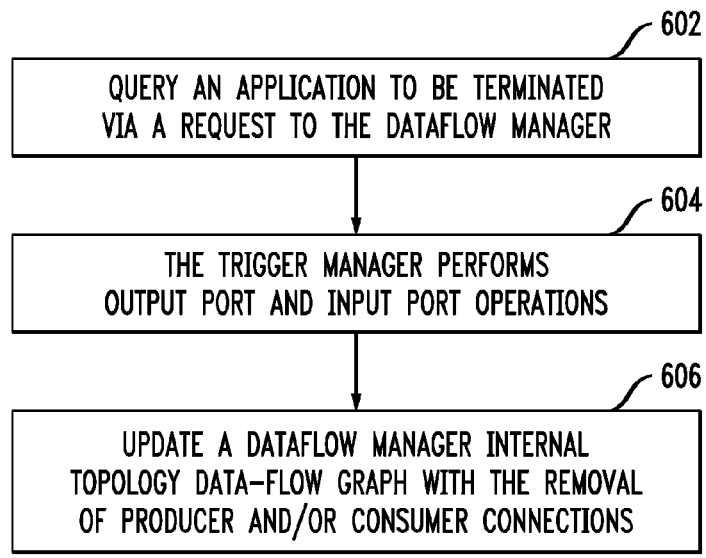
FIG. 6 is a flow diagram illustrating how the termination of a new application triggers a modification in the flow-graph as new producer and/or consumer stream connections are torn down, according to an embodiment of the invention.

One or more embodiments of the invention also include a sequence of steps or API calls that are involved between the various components described herein when an existing application is terminated via a request to the data flow manager (as depicted, for example, by FIG. 6). The system run-time can call the trigger manager APIs for application registration, passing as a parameter, the application being terminated. For each output port of the operators in the application to be terminated, the trigger manager issues an API call for the deletion of the corresponding stream profile from the profile manager, and notifies the consumers of streams from these output ports about the impending termination of a producer. For each of the input ports of the operators in the application to be terminated, the subscription manager is issued an API call for the removal of the corresponding subscription expression (or function), and their producers are notified about the impending termination of a consumer.

Also, the data flow manager can update its internal dataflow graph topology with the removal of the about-to-be removed connections. Additionally, for every remaining consumer which had lost one or more producers in the above process, the data flow manager re-applies the ranking technique in order to ensure that the optimal set of streams is chosen for that consumer.

As noted above, FIG. 6 is a flow diagram illustrating how the termination of a new application triggers a modification in the flow-graph as new producer and/or consumer stream connections are torn down, according to an embodiment of the invention. Step 602 includes querying an application to be terminated via a request to the dataflow manager. Step 604 includes the trigger manager performing output port and input port operations. For example, for each output port of the operators in the application to be terminated, a profile manager is cleaned up and consumers are notified by the dataflow manager about the impending termination of a producer. For each input port of the operators in the application to be terminated, a subscription expression manager is cleaned up and producers are notified by the dataflow manager about the impending termination of a consumer. Additionally, for each input port of the remaining operators, if there was a change in the producer set of the input port, the data flow manager re-applies a ranking technique in order to re-compute the correct set of streams for this input port.

Further, step 606 includes updating the dataflow manager internal topology data-flow graph with the removal of producer and/or consumer connections.

Figure 7:
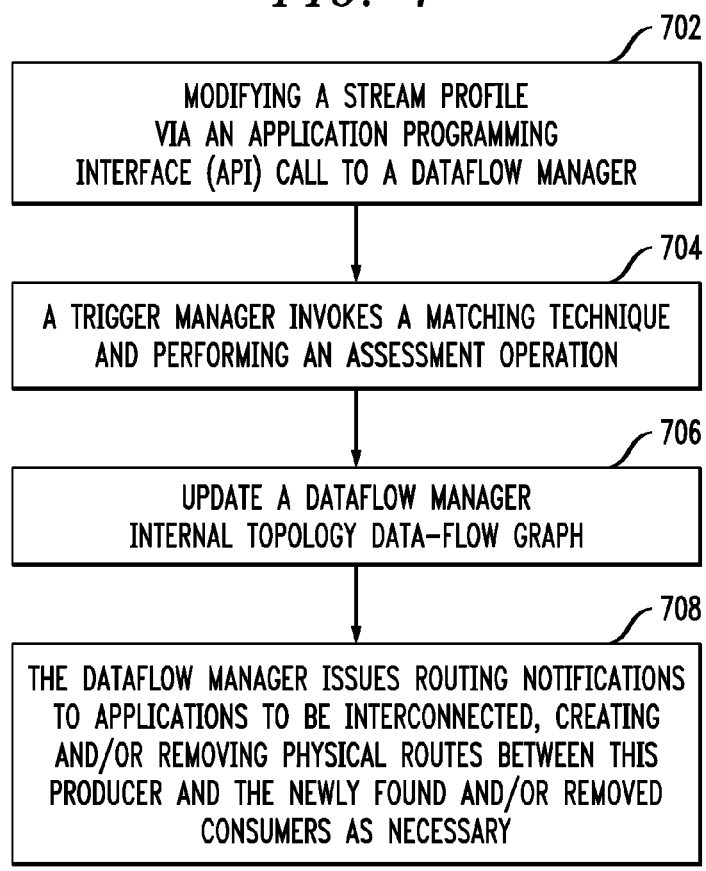
FIG. 7 is a flow diagram illustrating how the modification of a stream profile describing the properties associated with a stream triggers a modification in the flow-graph as new producer and/or consumer stream connections are made and/or torn down, according to an embodiment of the invention.

One or more embodiments of the invention also include a sequence of steps or API calls that are involved between the various components described herein when a stream profile is modified (that is, addition, deletion, or modification of properties in a stream profile) by the operator producing the stream, other operators, or externally by an administration (as depicted, for example, by FIG. 7). The data flow manager invokes the trigger manager with the identification (ID) of the specific output port whose profile is being modified. The trigger manager invokes the profile manager and ensures that the appropriate modification for the stream profile is carried out.

Further, the trigger manager invokes the matching technique on the set of all consumers to check of the modified stream is a potential match for the consumer, and reapplies the ranking function on consumers which either subscribed to this stream earlier (before the profile was modified) or subscribe to the stream now (after the reapplication of the matching technique). Also, the data flow manager can perform the requisite updates in its internal data flow graph topology. The data flow manager can additionally issue routing notifications to applications to be interconnected, creating or removing physical routes between the producer and the relevant consumers as necessary.

As noted above, FIG. 7 is a flow diagram illustrating how the modification of a stream profile describing the properties associated with a stream triggers a modification in the flow-graph as new producer and/or consumer stream connections are made and/or torn down, according to an embodiment of the invention. Step 702 includes modifying a stream profile (for example, new property, property deletion, or property update) via an application programming interface (API) call to a dataflow manager (for example, by the operator producing the stream, other operators, or externally by an administration console). Step 704 includes a trigger manager invoking a matching technique and performing an assessment operation. By way of example, for each input port belonging to other applications, the trigger manager assesses whether the exported stream whose profile was changed now match (or not) their subscription expression and/or function, respecting their ranking criteria.

Step 706 includes updating a dataflow manager internal topology data-flow graph. Also, step 708 includes the dataflow manager issuing routing notifications to applications to be interconnected, creating and/or removing physical routes between this producer and the newly found and/or removed consumers as necessary.

Figure 8:
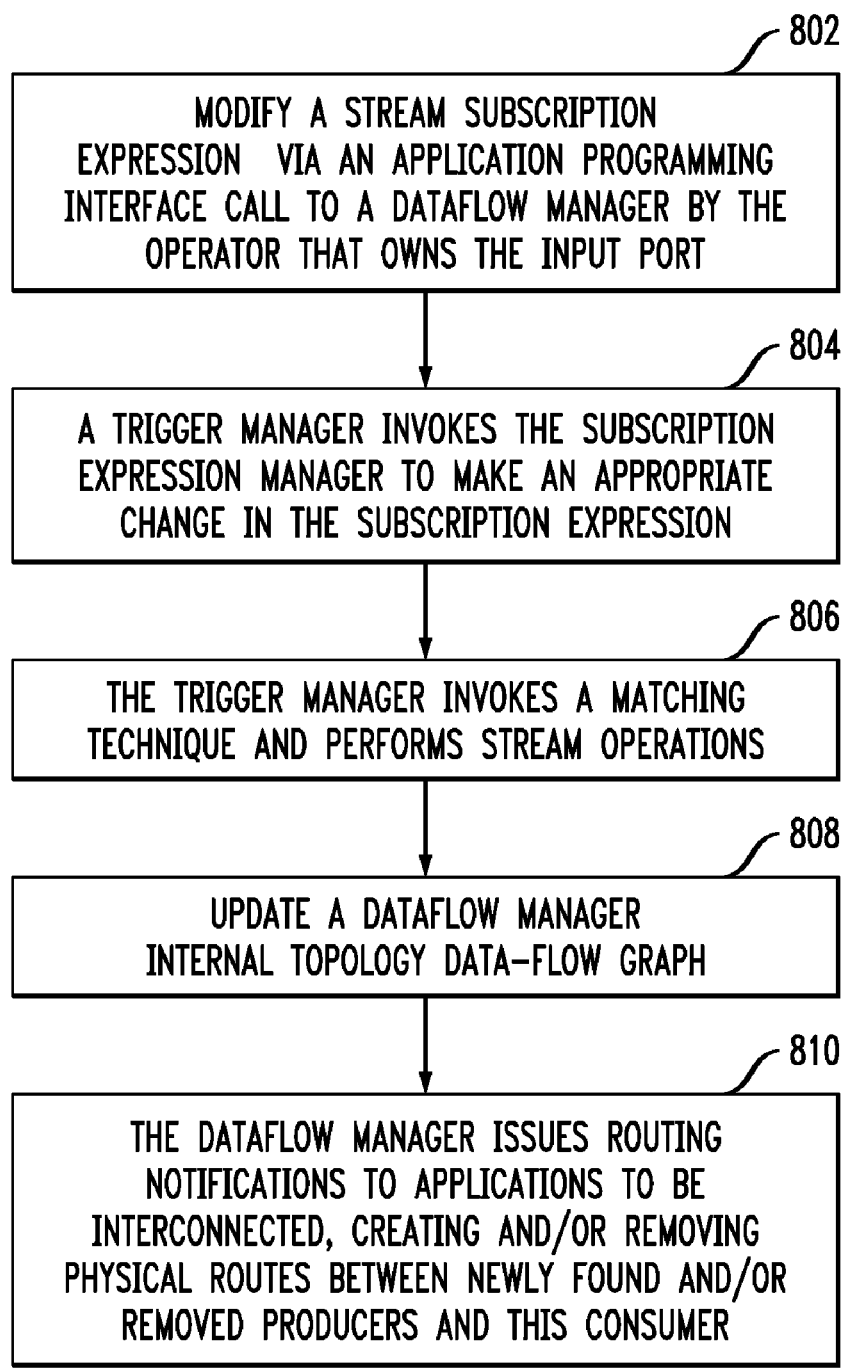
FIG. 8 is a flow diagram illustrating how the modification of a subscription expression associated with a component's input port triggers a modification in the flow-graph as new producer and/or consumer stream connections are made and/or torn down, according to an embodiment of the invention.

Additionally, one or more embodiments of the invention also includes a sequence of steps or API calls that are involved between the various components described herein when a subscription expression is modified via an API call to the data flow manager by the operator which owns the input port (as depicted, for example, by FIG. 8). The data flow manager invokes the trigger manager with the ID of the specific input port whose subscription expression is being modified. The trigger manager invokes the subscription expression manager and ensures that the appropriate modification for the subscription expression is carried out.

Further, the trigger manager invokes the matching technique on this consumer to find the set of all streams that match this consumer, and applies the ranking technique to select the optimal subset of streams that satisfies the ranking constraints imposed by the consumer. Additionally, the data flow manager can perform the requisite updates in its internal data flow graph topology. The data flow manager can also issue routing notifications to applications to be interconnected, creating or removing physical routes between the relevant producers and the consumer.

As noted above, FIG. 8 is a flow diagram illustrating how the modification of a subscription expression associated with a component's input port triggers a modification in the flow-graph as new producer and/or consumer stream connections are made and/or torn down, according to an embodiment of the invention. Step 802 includes modifying a stream subscription expression via an application programming interface (API) call to a dataflow manager by the operator that owns the input port. Step 804 includes a trigger manager invoking the subscription expression manager to make an appropriate change in the subscription expression.

Step 806 includes the trigger manager invoking a matching technique and performing stream operations. By way of example, the trigger manager can find streams that match the new subscription expression. Additionally, the trigger manager can apply ranking criteria and cull the list to include an optimal subset of streams that satisfies the constraint imposed by the ranking criteria.

Step 808 includes updating a dataflow manager internal topology data-flow graph. Further, step 810 includes the dataflow manager issuing routing notifications to applications to be interconnected, creating and/or removing physical routes between newly found and/or removed producers and this consumer.

Figure 9:
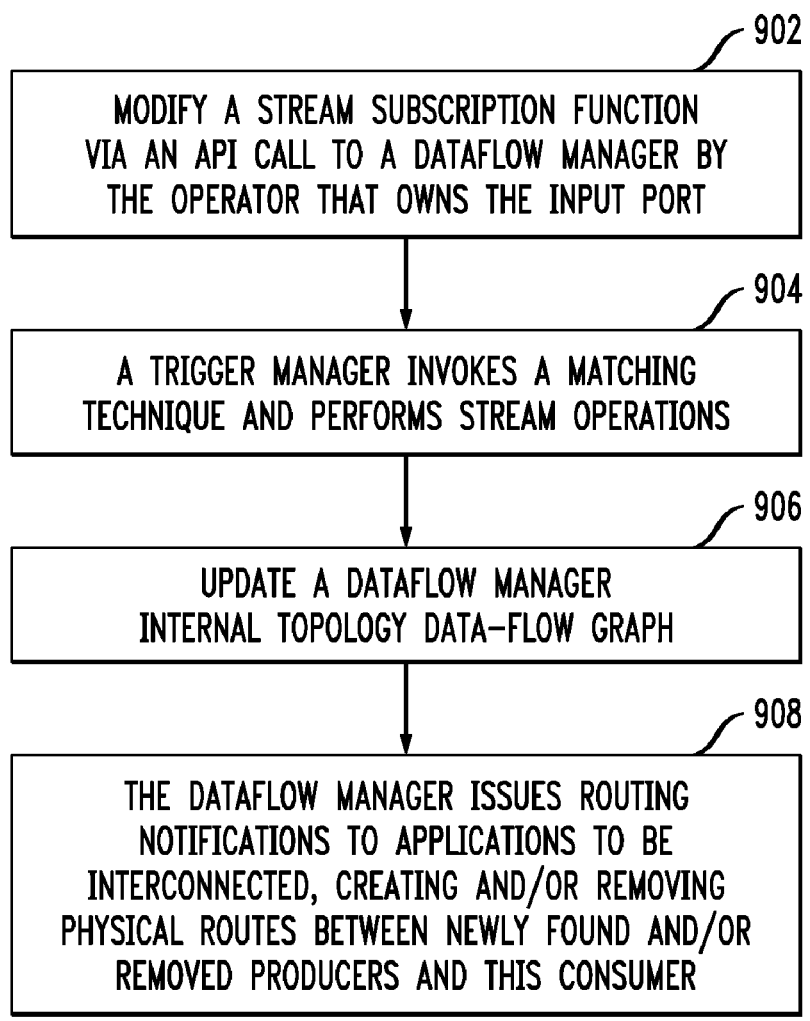
FIG. 9 is a flow diagram illustrating how the modification of a subscription function associated with a component's input port triggers a modification in the flow-graph as new producer and/or consumer stream connections are made and/or torn down, according to an embodiment of the invention.

One or more embodiments of the invention can also include a sequence of steps or API calls that are involved between the various components described herein when a subscription function is modified via an API call to the data flow manager by the operator which owns the input port (as depicted, for example, by FIG. 9). The data flow manager invokes the trigger manager with the identifier of the specific input port whose subscription function is being modified. The trigger manager invokes the subscription expression manager and ensures that the new subscription function is registered.

Further, the trigger manager invokes the matching technique on this consumer to find the set of all streams that match this consumer, and applies the ranking technique to select the optimal subset of streams that satisfies the ranking constraints imposed by the consumer. Additionally, the data flow manager can perform the requisite updates in its internal data flow graph topology. Also, the Data Flow Manager can issue routing notifications to applications to be interconnected, creating or removing physical routes between the relevant producers and the consumer.

FIG. 9 is a flow diagram illustrating how the modification of a subscription function associated with a component's input port triggers a modification in the flow-graph as new producer and/or consumer stream connections are made and/or torn down, according to an embodiment of the invention. Step 902 includes modifying a stream subscription function via an API call to a dataflow manager by the operator that owns the input port. Step 904 includes a trigger manager invoking a matching technique and performing stream operations. For example, the trigger manager can find streams that match the new subscription function, and apply ranking criteria and cull the list to include a maximal number of streams that satisfies the constraint imposed by the ranking criteria.

Step 906 includes updating a dataflow manager internal topology data-flow graph. Also, step 908 includes the dataflow manager issuing routing notifications to applications to be interconnected, creating and/or removing physical routes between newly found and/or removed producers and this consumer.

Figure 10:
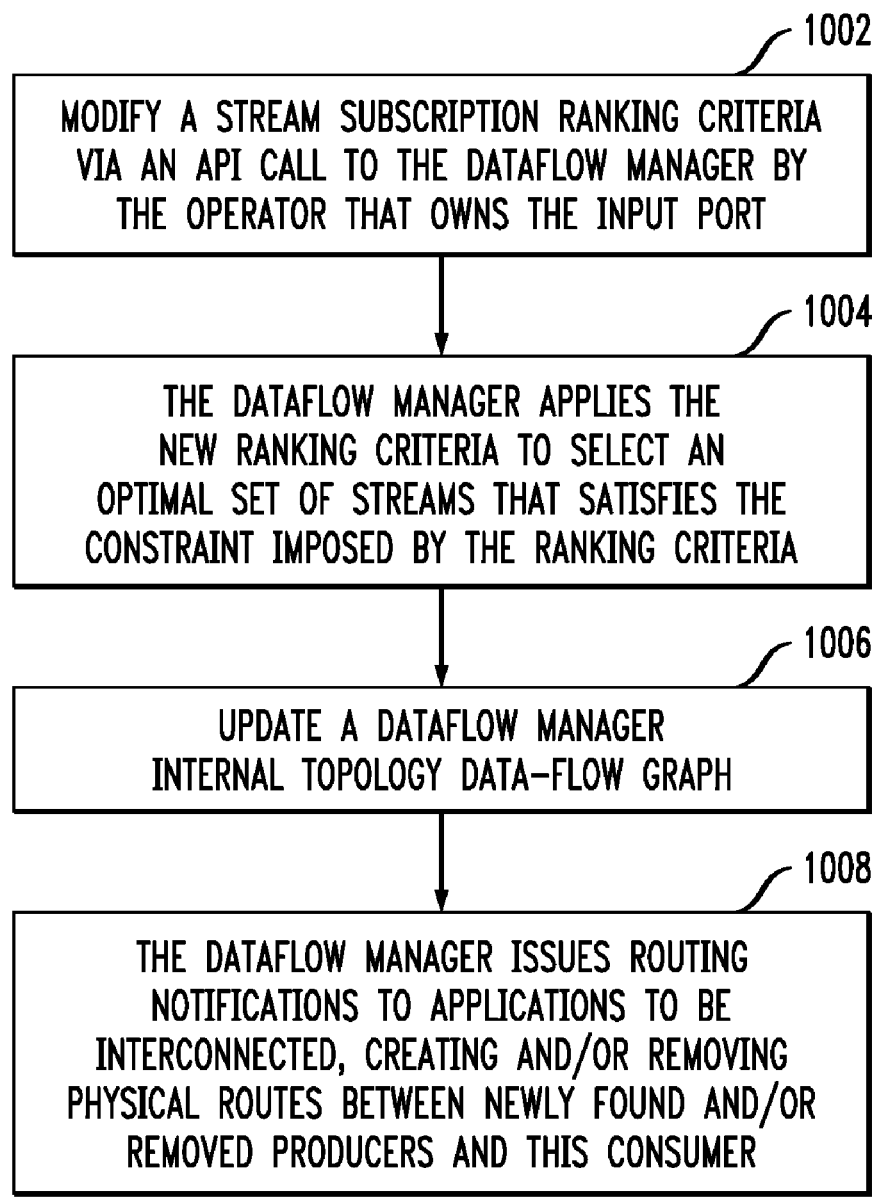
FIG. 10 is a flow diagram illustrating how the modification of a subscription ranking criteria associated with a component's input port triggers a modification in the flow-graph as new producer and/or consumer stream connections are made and/or torn down, according to an embodiment of the invention.

One or more embodiments of the invention can additionally include a sequence of steps or API calls that are involved between the various components described herein when a ranking criteria are modified via an API call to the data flow manager by the operator which owns the input port (as depicted, for example, by FIG. 10). The data flow manager applies the new ranking criteria to select an optimal set of streams that satisfy the constraints imposed by the ranking criteria. Further, the data flow manager can perform the requisite updates in its internal data flow graph topology and issue routing notifications to applications to be interconnected, creating or removing physical routes between the relevant producers and the consumer.

As noted above, FIG. 10 is a flow diagram illustrating how the modification of a subscription ranking criteria associated with a component's input port triggers a modification in the flow-graph as new producer and/or consumer stream connections are made and/or torn down, according to an embodiment of the invention. Step 1002 includes modifying a stream subscription ranking criteria via an API call to a dataflow manager by the operator that owns the input port. Step 1004 includes the data flow manager applying the new ranking criteria to select an optimal set of streams that satisfies the constraint imposed by the ranking criteria.

Step 1006 includes updating a dataflow manager internal topology data-flow graph. Additionally, step 1008 includes the dataflow manager issuing routing notifications to applications to be interconnected, creating and/or removing physical routes between newly found and/or removed producers and this consumer.

Figure 11:
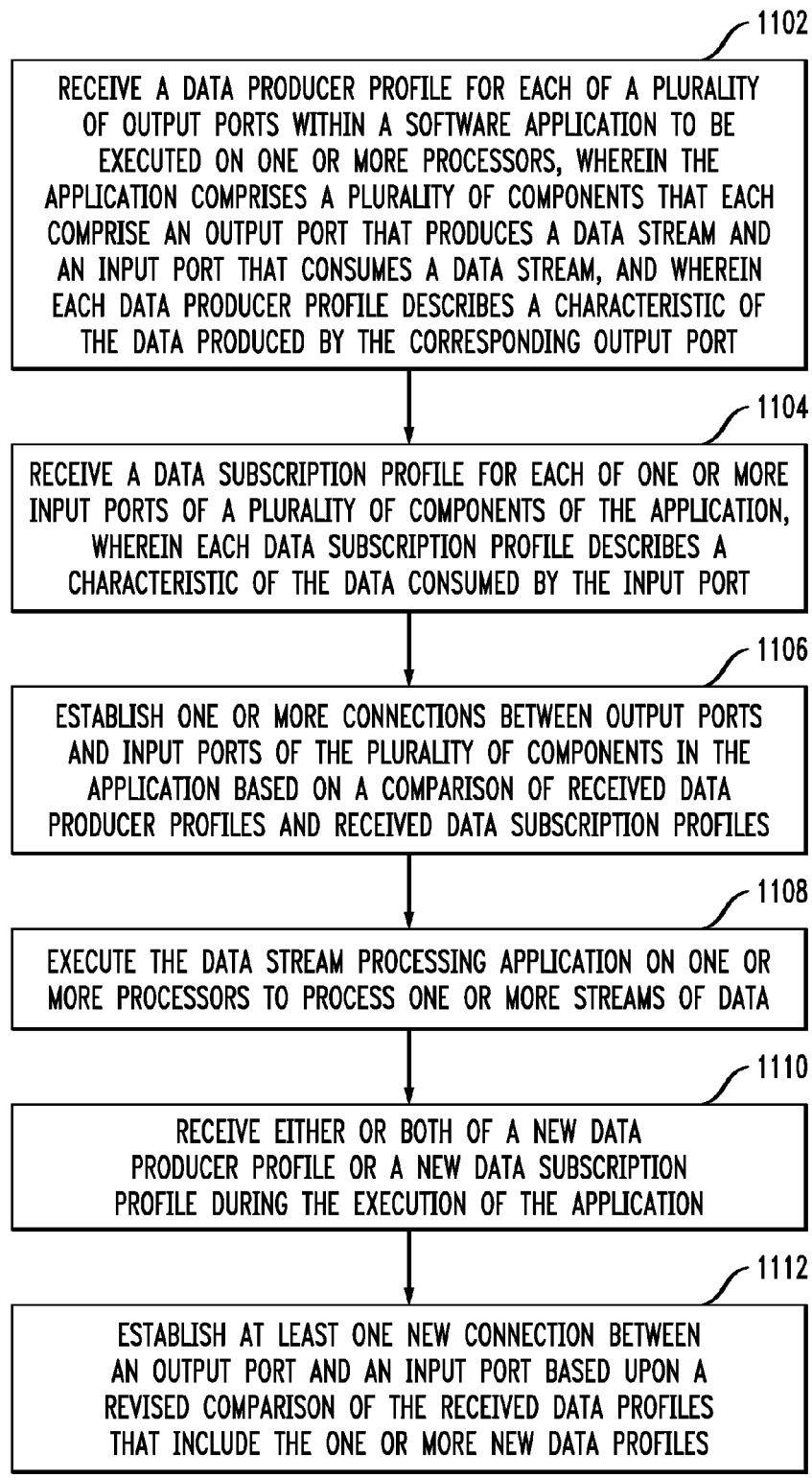
FIG. 11 is a flow diagram illustrating techniques for dynamically modifying inter-connections between a plurality of components in a component-based data stream processing application, according to an embodiment of the invention.

FIG. 11 is a flow diagram illustrating techniques for dynamically modifying inter-connections between a plurality of components in a component-based data stream processing application, according to an embodiment of the present invention. The application can include a distributed application (that is, different pieces running on different computers) as well as an application made up of different components (that is, distributed items of multiple components).

Step 1102 includes receiving a data producer profile for each of a plurality of output ports within a software application to be executed on one or more processors, wherein the application comprises a plurality of components that each comprise an output port that produces a data stream and an input port that consumes a data stream, and wherein each data producer profile describes a characteristic of the data produced by the corresponding output port. This step can be carried out, for example, using one or more of the distinct software components described herein. Receiving a data producer profile for each of a plurality of output ports within a software application can include specification of these profiles at the time of application development (for example, using the constructs in the SPADE programming language), or through the use of the run-time APIs. Also, a characteristic of the data produced by an output port can include, for example, a characteristic in a form of a profile that applies to all data carried by the data source (for example, a stream in stream processing systems).

Step 1104 includes receiving a data subscription profile for each of one or more input ports of a plurality of components of the application, wherein each data subscription profile describes a characteristic of the data consumed by the input port. This step can be carried out, for example, using one or more of the distinct software components described herein. Receiving a data subscription profile for each of one or more input ports of a plurality of components of the application can include specification of the subscription expressions during application development (for example, using the)(PATH subscription mechanism in SPADE language), or through the use of run-time APIs. Also, a characteristic of the data consumed by an input port can include, for example, a declarative subscription expression, a procedural subscription technique and/or a logical predicate (for example, one per consumer) defined on one or more data source profile properties.

Step 1106 includes establishing one or more connections between output ports and input ports of the plurality of components in the application based on a comparison of received data producer profiles and received data subscription profiles. This step can be carried out, for example, using one or more of the distinct software components described herein. One or more embodiments of the invention also include using APIs to allow querying and updating of profiles, allowing dynamic physical reconfiguration of application inter-connections.

Step 1108 includes executing the data stream processing application on one or more processors to process one or more streams of data. This step can be carried out, for example, using one or more of the distinct software components described herein. Processing one or more streams of data can include deploying the processing elements at various processing nodes of the system and executing them.

Step 1110 includes receiving either or both of a new data producer profile or a new data subscription profile during the execution of the application. This step can be carried out, for example, using one or more of the distinct software components described herein.

Step 1112 includes establishing at least one new connection between an output port and an input port based upon a revised comparison of the received data profiles that include the one or more new data profiles. This step can be carried out, for example, using one or more of the distinct software components described herein. Establishing a new connection between an output port and an input port can include using programming language constructs and run-time application programming interfaces to establish dynamic data connections between each producer and consumer at application deployment time and at run-time, respectively.

Further, establishing a new connection between an output port and an input port can additionally include dynamically interconnecting the output ports within the application and external data sources to the input ports within the application, as determined by matches between one or more data producer profile characteristics and one or more data subscription profile characteristics. One or more embodiments of the invention can include manipulating the data producer profiles and the data subscription profiles at run-time (including, for example, creation, deletion, and modification of the profile properties).

Manipulating the data producer profiles at run-time can include, for example, dynamically manipulating (for example, creating, deleting and/or modifying) data producer profile properties as a function of values of each data item generated by each output port, dynamically manipulating (for example, creating, deleting and/or modifying) data producer profile properties as a function of volume of each data item generated by each output port, and querying a profile manager (which can include, for example, ranking and filtering mechanisms). Manipulating the data subscription profiles at run-time can include, for example, modifying a stream subscription expression, and modifying a subscription function.

Also, establishing connections between the output ports and the input ports can further include storing a computed route within a data flow module and updating information stored in the data flow module each time a change occurs to a data profile and/or a data subscription.

The techniques depicted in FIG. 11 can also include receiving modifications to an existing data profile and/or an existing subscription expression during execution of the application. Also, in one or more embodiments of the invention, a subscription mechanism can be implemented by either one or a combination of the following steps. One can compute a match by applying a declarative subscription expression to the set of properties a stream has and assess whether the properties satisfy the predicate. Also, one can compute a match by applying a subscription function that can procedurally query the profile manager and carry out additional computation such as ranking, filtering, etc. and return a Boolean result stating which streams satisfy the function.

One or more embodiments of the invention can additionally include dynamically changing a consumer subscription (for example, when the subscriber is no longer interested in the original data or the subscriber's interest has deviated to something else), as well as dynamically changing an exported description of characteristics of exported data generated by an output port (that is, the stream profiles). Also, the techniques depicted in FIG. 11 can include creating and modifying a ranking criteria employed by a data consumer for constraining a set of data sources that will be connected to the consumer (for example, wherein a subscriber can rank sources according to some pre-defined criteria).

Further, one or more embodiments of the invention can include using a trigger mechanism to dynamically computing stream matches. Computing the stream matches can include, for example, registering each subscription expression and each subscription function, evaluating trigger conditions based on each subscription expression and/or each subscription function on newly registered streams, evaluating trigger conditions based on changes in stream properties, and evaluating trigger conditions based on changes in subscription expressions and/or each subscription functions.

The techniques depicted in FIG. 11 can also, as described herein, be run on a system, wherein the system includes distinct software components and/or modules, each of the distinct software components being embodied on a tangible computer-readable recordable storage medium. The distinct software components can include an application programming interface component, a profile manager component, a subscription expression manager component, a trigger manager component and a data flow component executing on a hardware processor.

Additionally, the techniques depicted in FIG. 11 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 12:
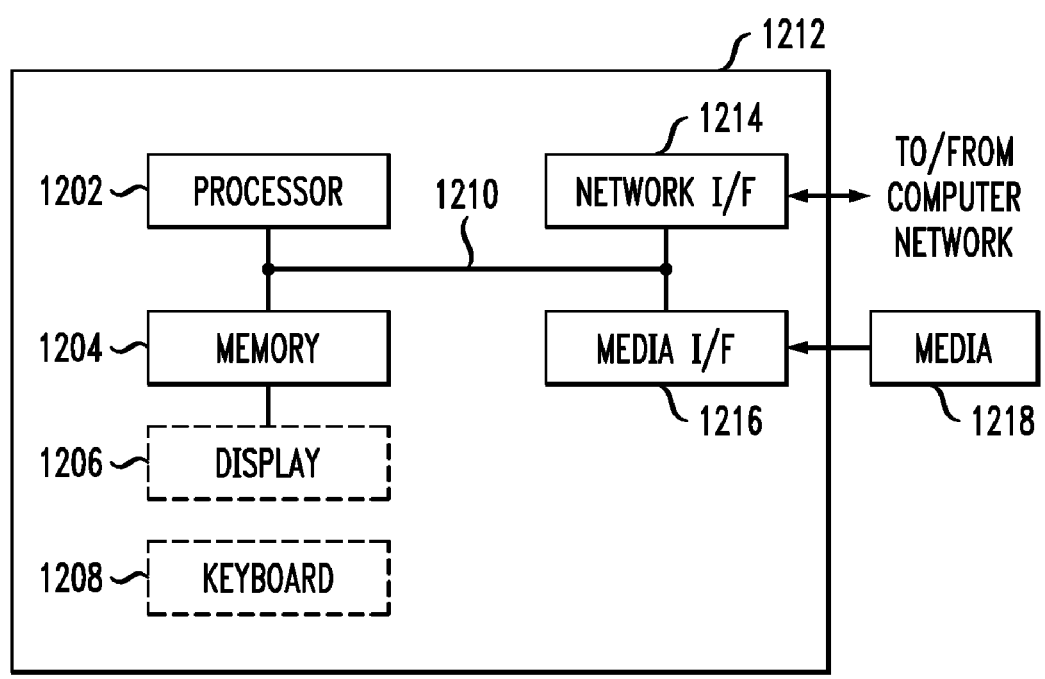
FIG. 12 is a system diagram of an exemplary computer system on which at least one embodiment of the invention can be implemented.

One or more embodiments can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1218) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 1204), magnetic tape, a removable computer diskette (for example media 1218), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 1202 coupled directly or indirectly to memory elements 1204 through a system bus 1210. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a component, module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software components embodied on a tangible computer readable storage medium; the components can include any or all of the components shown in FIG. 3. The method steps can then be carried out using the distinct software components and/or sub-components of the system, as described above, executing on a hardware processor. Further, a computer program product can include a tangible computer-readable storage medium with code adapted to be executed to carry out one or more method steps described herein, including the provision of the system with the distinct software components.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, describing the characteristics of data produced by applications at the granularity of a producer.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system for dynamically modifying inter-connections between a plurality of components in a component-based data stream processing application, comprising:
   a processor;
   a memory coupled to the processor;
   a profile manager module stored on the memory to receive a data producer profile for each of a plurality of output ports within a software application to be executed on one or more processors, wherein the application comprises a plurality of components that each comprise an output port that produces a data stream and an input port that consumes a data stream, and wherein each data producer profile describes a characteristic of the data produced by the corresponding output port;
   a subscription expression manager module stored on the memory to receive a data subscription profile for each of one or more input ports of a plurality of components of the application, wherein each data subscription profile describes a characteristic of the data consumed by the corresponding input port; and
   a data flow module stored on the memory to establish one or more connections between output ports and input ports of the plurality of components in the application based on a comparison of each data producer profile and each data subscription profile.

2. The system of claim 1, wherein the processor is operative to execute a data stream processing application to process one or more streams of data, the profile manager module is further operative to receive a new data producer profile during the execution of the data stream processing application, and the data flow module is further operative to establish at least one new connection between an output port and an input port based upon a revised comparison of the received data profiles that includes the new data producer profile.

3. The system of claim 1, wherein the processor is operative to execute a data stream processing application to process one or more streams of data, the subscription expression manager module is further operative to receive a new data subscription profile during the execution of the data stream processing application, and the data flow module is further operative to establish at least one new connection between an output port and an input port based upon a revised comparison of the received data profiles that includes the new data subscription profile.

4. The system of claim 1, wherein the at least one processor coupled to the memory operative to establish at least one new connection between an output port and an input port is further operative to dynamically interconnect one or more output ports within the application and one or more external data sources to one or more input ports within the application as determined by one or more matches between one or more data producer profile characteristics and one or more data subscription profile characteristics.

5. The system of claim 1, wherein the at least one processor coupled to the memory is further operative to create and modify a ranking criteria employed by a data consumer for constraining a set of one or more data sources that will be connected to the consumer.

6. A method for dynamically modifying inter-connections between a plurality of components in a component-based data stream processing application, the method comprising:
receiving a data producer profile for each of a plurality of output ports within a software application to be executed on one or more processors, wherein the application comprises a plurality of components that each comprise an output port that produces a data stream and an input port that consumes a data stream, and wherein each data producer profile describes a characteristic of the data produced by the corresponding output port;
receiving a data subscription profile for each of one or more input ports of a plurality of components of the application, wherein each data subscription profile describes a characteristic of the data consumed by the input port;
establishing one or more connections between output ports and input ports of the plurality of components in the application based on a comparison of received data producer profiles and received data subscription profiles;
executing the data stream processing application on one or more processors to process one or more streams of data;
receiving either or both of a new data producer profile or a new data subscription profile during the execution of the application; and
establishing at least one new connection between an output port and an input port based upon a revised comparison of the received data profiles that include the one or more new data profiles.

7. The method of claim 6, further comprising receiving one or more modifications to at least one of an existing data profile and an existing subscription expression during execution of the application.

8. The method of claim 6, wherein receiving a data producer profile for each of a plurality of output ports within a software application comprises at least one of specification of the data profile during application development, and programmatic specification of the data profile by the application during execution through one or more run-time application programming interfaces.

9. The method of claim 6, wherein receiving a data subscription profile for each of one or more input ports of a plurality of components of the application comprises at least one of specification of the subscription during application development, and programmatic specification of the subscription by the application during execution through one or more run-time application programming interfaces.

10. The method of claim 6, wherein processing one or more streams of data comprises deploying one or more processing elements on one or more processing nodes of a system and executing the one or more processing elements.

11. The method of claim 6, wherein establishing at least one new connection between an output port and an input port comprises using one or more programming language constructs and run-time application programming interfaces to establish one or more dynamic data connections between each producer and consumer at application deployment time and at run-time, respectively.

12. The method of claim 6, wherein establishing at least one new connection between an output port and an input port further comprises dynamically interconnecting one or more output ports within the application and one or more external data sources to one or more input ports within the application as determined by one or more matches between one or more data producer profile characteristics and one or more data subscription profile characteristics.

13. The method of claim 12, further comprising manipulating the one or more data producer profiles and the one or more data subscription profiles at run-time.

14. The method of claim 13, wherein manipulating the one or more data producer profiles at run-time comprises:
dynamically manipulating one or more data producer profile properties as a function of one or more values of each data item generated by each output port;
dynamically manipulating one or more data producer profile properties as a function of volume of each data item generated by each output port; and
querying a profile manager.

15. The method of claim 13, wherein manipulating the one or more data subscription profiles at run-time comprises:
modifying a stream subscription expression; and
modifying a subscription function.

16. The method of claim 6, wherein establishing one or more connections between the output ports and the input ports further comprises:
storing a computed route within a data flow module; and
updating information stored in the data flow module each time a change occurs to at least one of a data profile and a data subscription.

17. The method of claim 6, wherein a characteristic of the data produced by an output port comprises a characteristic in a form of a profile that applies to all data carried by a source of the data.

18. The method of claim 6, wherein a characteristic of the data consumed by an input port comprises at least one of a declarative subscription expression, a procedural subscription technique and a logical predicate defined on one or more data source profile properties.

19. The method of claim 6, further comprising dynamically changing a consumer subscription.

20. The method of claim 6, further comprising dynamically changing an exported description of a characteristic of exported data generated by an output port.

21. The method of claim 6, further comprising creating and modifying a ranking criteria employed by a data consumer for constraining a set of one or more data sources that will be connected to the consumer.

22. The method of claim 6, further comprising using a trigger mechanism to dynamically compute one or more stream matches, wherein computing the one or more stream matches comprises:
registering each subscription expression and each subscription function;
evaluating one or more trigger conditions based on at least one of each subscription expression and each subscription function on one or more newly registered streams;
evaluating one or more trigger conditions based on one or more changes in one or more stream properties; and
evaluating one or more trigger conditions based on one or more changes in at least one of one or more subscription expressions and one or more subscription functions.

23. The method of claim 6, wherein the method is run on a system, wherein the system comprises one or more distinct software components, each of the one or more distinct software components being embodied on a tangible computer-readable recordable storage medium, and wherein the one or more distinct software modules comprise an application programming interface module, a profile manager module, a subscription expression manager module, a trigger manager module and a data flow module executing on a hardware processor.

24. A computer program product comprising a tangible computer readable recordable storage medium including computer useable program code for dynamically modifying inter-connections between a plurality of components in a component-based data stream processing application, the computer program product including:
computer useable program code for receiving a data producer profile for each of a plurality of output ports within a software application to be executed on one or more processors, wherein the application comprises a plurality of components that each comprise an output port that produces a data stream and an input port that consumes a data stream, and wherein each data producer profile describes a characteristic of the data produced by the corresponding output port;
computer useable program code for receiving a data subscription profile for each of one or more input ports of a plurality of components of the application, wherein each data subscription profile describes a characteristic of the data consumed by the corresponding input port;
computer useable program code for establishing one or more connections between the output ports and the input ports of the plurality of components in the application based on a comparison of the received data producer profile and the received data subscription profile;
computer useable program code for executing the data stream processing application on one or more processors to process one or more streams of data;
computer useable program code for receiving either or both of a new data producer profile or a new data subscription profile during the execution of the application; and
computer useable program code for establishing at least one new connection between an output port and an input port based upon a revised comparison of the received data profiles that include the one or more new data profiles.

25. The computer program product of claim 24, further comprising computer useable program code for receiving one or more modifications to at least one of an existing data profile and an existing subscription expression during execution of the application.

26. The computer program product of claim 24, wherein the computer useable program code for establishing at least one new connection between an output port and an input port comprises computer useable program code for using one or more programming language constructs and run-time application programming interfaces to establish one or more dynamic data connections between each producer and consumer at application deployment time and at run-time, respectively.

27. The computer program product of claim 24, wherein the computer useable program code for establishing at least one new connection between an output port and an input port further comprises computer useable program code for dynamically interconnecting one or more output ports within the application and one or more external data sources to one or more input ports within the application as determined by one or more matches between one or more data producer profile characteristics and one or more data subscription profile characteristics.

28. The computer program product of claim 24, further comprising computer useable program code for creating and modifying a ranking criteria employed by a data consumer for constraining a set of one or more data sources that will be connected to the consumer.

29. The computer program product of claim 24, wherein the computer usable program code comprises one or more distinct software modules, and wherein the one or more distinct software modules comprise an application programming interface module, a profile manager module, a subscription expression manager module, a trigger manager module and a data flow module executing on a hardware processor.

* * * * *